United States Patent [19]

Wall

[11] 4,152,943

[45] May 8, 1979

[54] VIBRATORY MECHANISM

[75] Inventor: Geoffrey F. Wall, Carlisle, Pa.

[73] Assignee: Ingersoll-Rand Company, Woodcliff Lake, N.J.

[21] Appl. No.: 880,775

[22] Filed: Feb. 24, 1978

[51] Int. Cl.[2] .............................................. F16H 33/10

[52] U.S. Cl. ........................................... 74/87; 74/61; 404/117

[58] Field of Search ....................... 74/61, 87; 404/117, 404/113

[56] References Cited

U.S. PATENT DOCUMENTS

| | | | |
|---|---|---|---|
| 3,026,781 | 3/1962 | Schafer | 74/87 X |
| 3,590,702 | 7/1971 | Sechi | 404/117 |
| 3,722,381 | 3/1973 | Tuneblom | 74/87 X |
| 3,736,066 | 5/1973 | Koontz | 404/117 |
| 3,871,788 | 3/1975 | Barsby | 404/117 |
| 3,892,496 | 7/1975 | Martinez | 404/117 |

*Primary Examiner*—C. J. Husar
*Assistant Examiner*—Conrad L. Berman
*Attorney, Agent, or Firm*—Bernard J. Murphy

[57] ABSTRACT

According to the depicted embodiment, two eccentric-weight units are rotated into or out of radial alignment with each other to cause an increase or diminution of vibration. The units are journaled in a frame and a coupling assembly causes both to rotate in unison, but the assembly is also operative to rotationally index one of the weight units relative to the other to vary the noted radial-alignment relationship, as desired. One of the weight units comprises a pair of separate weights, each having an eccentric-throw portion, which are separated along the rotation axis and which are joined for common rotation by a resilient coupling. The latter coupling sustains and reactively absorbs any misalignments and/or displacements arising between the separate weights. The other weight unit is an elongate, eccentric shaft coaxial with the separate weights.

20 Claims, 3 Drawing Figures

VIBRATORY MECHANISM

This invention pertains to mechanisms for generating, and imparting to associated structures, vibratory motions, and, in particular, pertains to such vibratory mechanisms having an especial use in and with roller drums of earth-compacting equipment.

Vibratory mechanisms, especially as used in drum-type earth compactors, have historically employed a single round shaft with eccentrically-machined bearing seats to produce a centrifugal force while the shaft is revolved. Spherical roller bearings, one at each end of the shaft, are utilized in such a design, to compensate for deflection of the shaft at speed. In such an arrangement, the spherical bearings have the following limitations: high unit cost, speed limitations approximating desired vibration frequencies, loss of lubricant to one bearing in a tilted drum condition (particularly severe in long drums) and inability to compensate for thermal expansion of the shaft.

In an effort to make the vibratory compactor more versatile, that is, to permit use of the compactor on many types and thicknesses of material, the need for a variable compacting force irrespective of frequency was ascertained. This need resulted in several concepts of variable amplitude vibratory mechanisms based on the two-bearing drum arrangement. One concept employs transfer of liquid between chambers, another the repositioning of weights one within another, and still another with a movable and a fixed weight, the first of which depends on deflection of springs at various frequencies.

Most of the efforts to overcome limitations of the two-bearing drum arrangement have resulted in a dual eccentric design, utilizing four bearings of various types. Employing inexpensive tapered roller bearings, the dual eccentric concept can utilize high offset eccentric weights and a short distance between bearings to overcome thermal expansion problems. Speed limits are not critical for tapered bearings, and lubricant cannot be lost in a tilted drum condition. However, these designs, too, have severe limitations. Tapered roller bearings must be precisely aligned. Also, mass manufacturing does not permit precise alignment of the two eccentrics, particularly in a long drum.

Efforts to employ a variable amplitude operation in a dual eccentric design have resulted in at least two concepts. One concept utilizes a movable and a fixed weight in each of two locations, and hydraulic power provides the necessary impetus to reposition the movable weight. Another concept again utilizes a movable and a fixed weight in each of two locations, but in this concept, the direction of rotation allows the movable weight to rotate about the fixed weight until mechanically stopped. If operated in one direction, a high force is generated, and conversely if rotated in the other direction, a low force is generated.

U.S. Pat. No. 3,590,702, issued to Peppino Sechi, on 6 July 1971, for a "Vibratory Roller" is yet another example of a dual eccentric design in which the two eccentrics are coaxially arranged within a compacting drum. The patentee has coupling means for effecting a common rotation of the two eccentrics, and the coupling means includes means for rotationally indexing one of the eccentrics, relative to the other, to cause the two to rotate in or out of radial alignment—thereby to control the vibratory amplitude.

It is an object of this invention to set forth an improved vibratory mechanism, especially for use with an earth-compacting drum, which also employs two eccentric-weight units, but with a simple and more facile means for selectively rotationally-indexing one of the units relative to the other.

It is also an object of this invention to disclose a vibratory mechanism, especially for use with an earth-compacting drum, comprising a plurality of separate weight means which have eccentric-throw portions; means supporting said weight means for rotation about a rotary axis, in spaced-apart locations with said eccentric-throw portions substantially radially aligned; and means coupling said weight means together for rotation in common; wherein said coupling means comprises resilient means for sustaining and reactively absorbing forces and loads arising from parallel and angular misalignments and rotary and axial displacements of said weight means relative to one another, and rigid shaft means axially interposed between said weight means, with said resilient means interpositioned between, and fixed to, said shaft means and each one of said weight means.

Further objects of this invention, as well as the novel features thereof, will become more apparent by reference to the following description taken in conjunction with the accompanying Figures in which.

Figure 1:
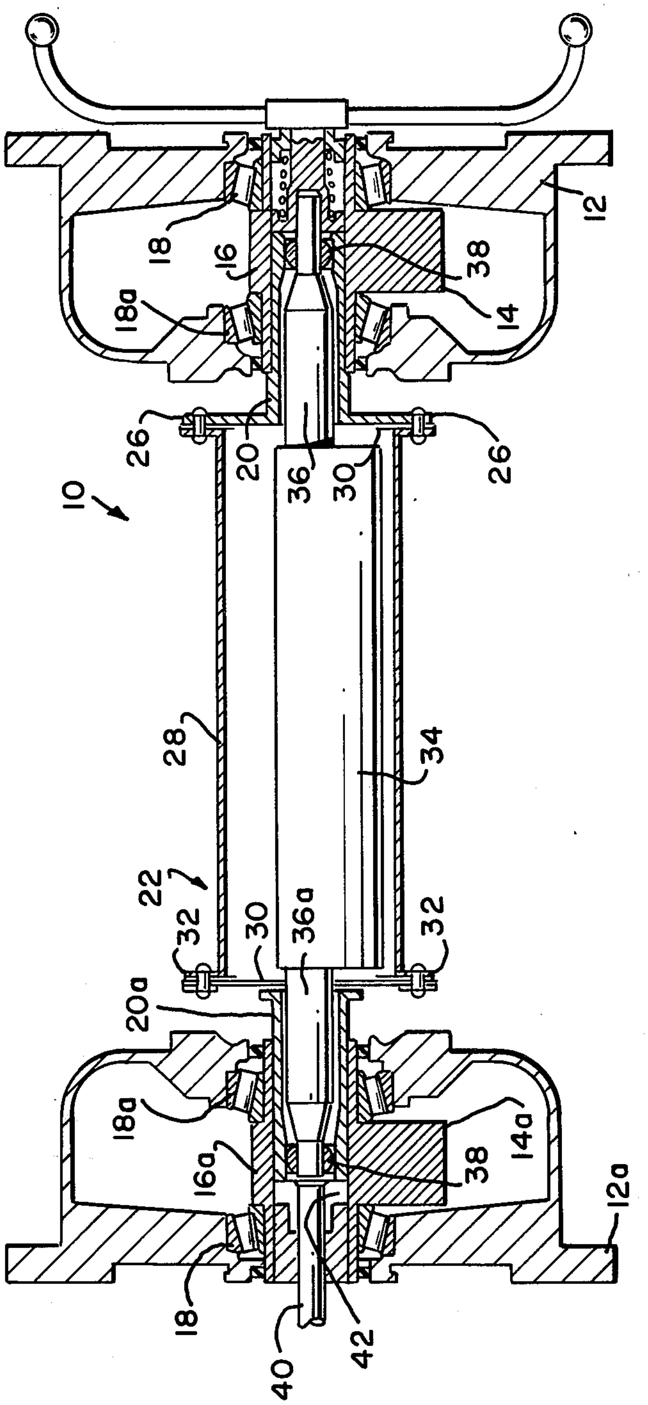
FIG. 1 is an axial, cross-sectional view of an embodiment of a vibratory mechanism, according to the invention, in a frame of a compacting drum of the earth compactor equipment.

As shown in the Figures, a vibratory mechanism 10, according to an embodiment of the invention, comprises a pair of end housings 12 and **12*a*. Housings 12 and 12*a* define axial journaling supports for an earth-compacting drum (not shown), and also support weight means which produce vibratory excitations of the drum. A first of the weight means comprises a pair of separate, eccentric-throw weights 14 and 14*a* keyed to weight-carrier shafts 16 and 16*a*, the shafts 16 and 16*a* being mounted in pairs of tapered roller bearings 18 and 18*a*. Shafts 16 and 16*a* are hollow and receive therewithin stub shafts 20 and 20*a*. Shafts 20 and 20*a* comprise the axial ends of a resilient coupling means 22 which rotatively joins the separate weights 14 and 14*a* and which sustains and reactively absorbs such forces and loads as arise from any parallel and/or angular misalignments and rotary and/or axial displacements of weights 14 and 14*a*** relative to one another.

Figure 2:
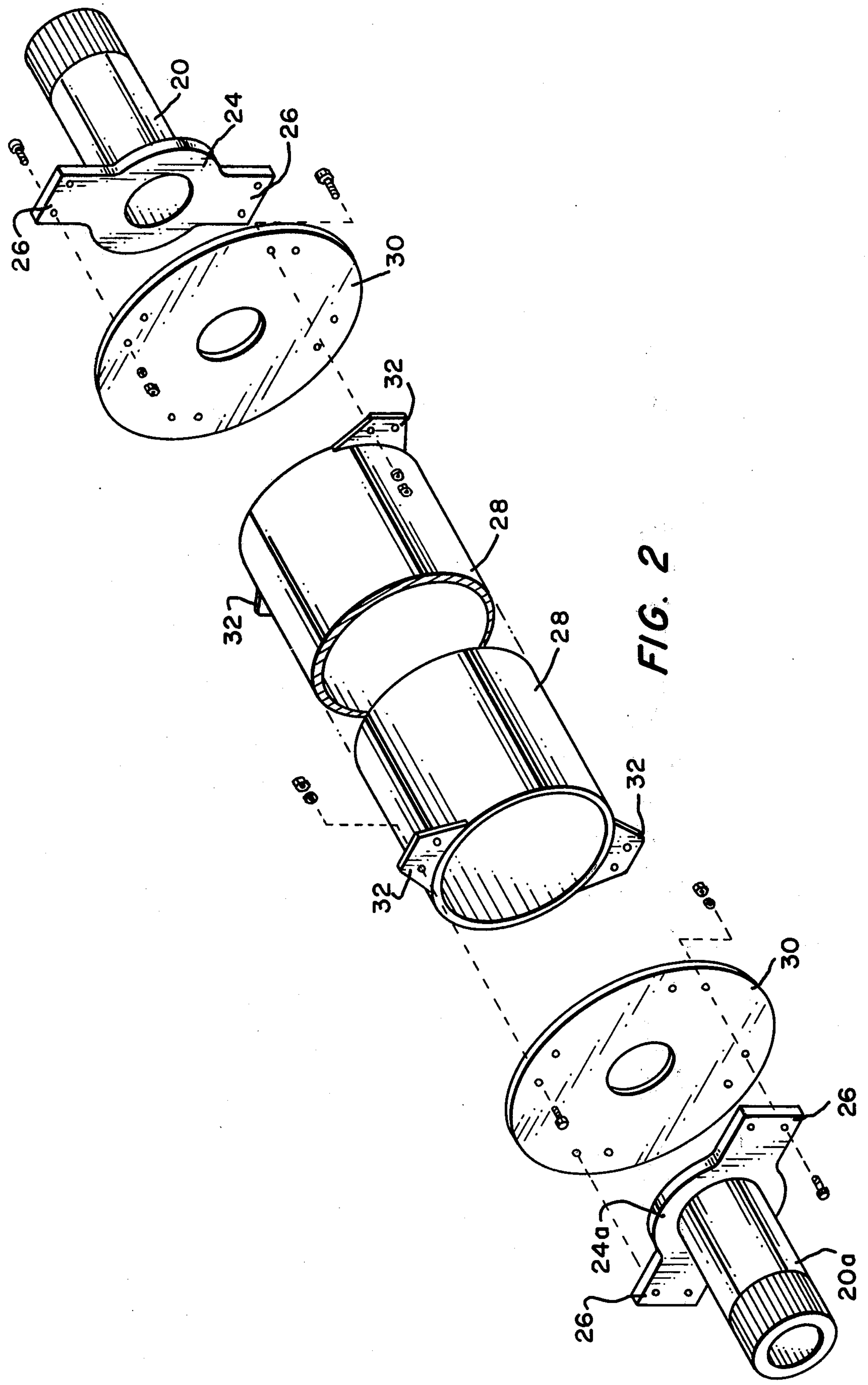
FIG. 2 is an isometric, exploded view of the novel resilient coupling arrangement, of the FIG. 1 embodiment, for the pair of separate, eccentric-throw weights.

FIG. 2 details the novel, resilient coupling means 22. Shafts 20 and **20*a* have flanged ends 24 and 24*a* with oppositely-extending coupling tabs 26. Tabs 26 with their associated flanged ends 24 and 24*a* receive a hollow "timing" shaft 28 and a pair of laminated discs 30 of multi-ply epoxy resin and fiberglass. The hollow shaft 28 has oppositely-extending coupling ears 32 fixed thereto at opposite ends thereof. Shafts 20 and 20*a* are so disposed that the tabs 26 of one thereof are rotated ninety degrees of arc from the other. Too, the coupling ears 32 of hollow shaft 28, at one end thereof, are rotated ninety degrees of arc from those at the other end. The ears 32, discs 30, and tabs 26 are bored to receive the fastening hardware shown. The discs 30 provide for the reactive absorption of misalignments and/or displacements occurring between stub shafts 20 and 20***a* from the centrifugal forces generated by rotation of weights 14 and 14*a*.

Shafts 20 and 20*a* have splining formed on the external surface of the cylindrical end portions thereof, and this splining is matingly engaged with splining formed on internal surfaces of the weight-carrier shafts 16 and 16*a*, to provide for common rotation of the weights 14 and 14*a*, shafts 16 and 16*a*, and the resilient coupling means 22.

A second weight means in the novel vibratory mechanism 10 is comprised by an eccentric shaft 34. Shaft 34 is enveloped by hollow shaft 28, and has reduced-diameter ends 36 and 36*a* which are received in spherical bushings 38. Bushings 38 are secured within the cylindrical end portions of shafts 20 and 20*a* thereby to journal the eccentric shaft 34. In a manner well known in the prior art, a drive motor (not shown) provides rotary torque to an input shaft 40 to impart rotation to both weight means, i.e., weights 14 and 14*a* and eccentric shaft 34. Shaft 40 has an annular drive member 42 fixed thereto. The outer circumference of member 42 is splined and matingly engages the splined internal surface of shaft 16*a*. In turn, the mating splines of shaft 16*a* and shaft 20*a* transmit rotation to shaft 20 and shaft 16.

Figure 3:
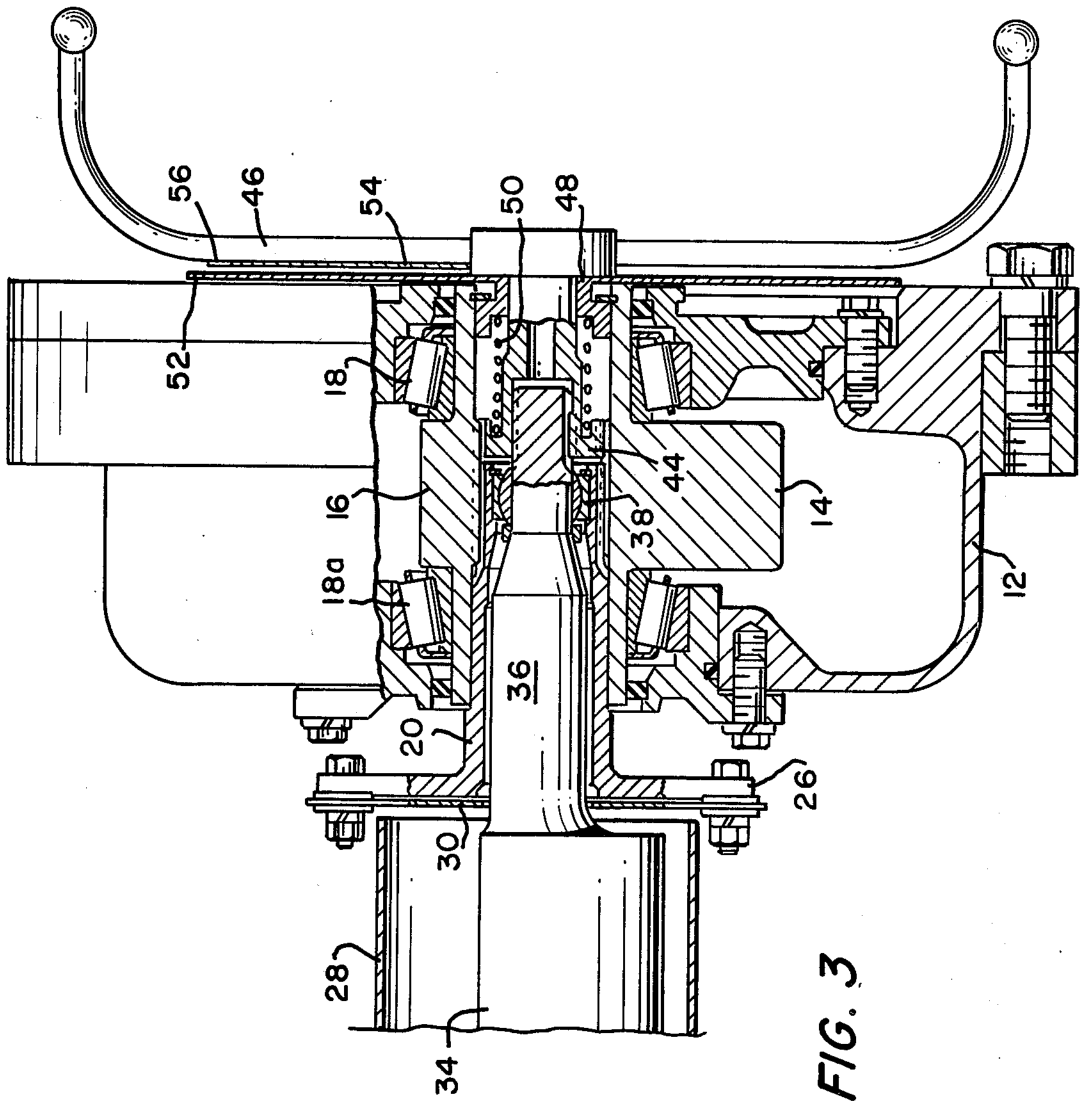
FIG. 3 is an enlarged, detailed, cross-sectional view of the "indexing" end of the mechanism.

As can be seen more clearly in Figure 3, end 36 of the eccentric shaft 34 also has external splining formed therein. Hence, this splined surface of shaft 34 and the splined surface of weight-carrier shaft 16 define therebetween an annular space. An internally and externally splined drive unit 44 is slidably disposed in the space to complete the rotary torque transmission—from shaft 16, through splined drive unit 44, to end 36 of the eccentric shaft 34.

It will be appreciated that weights 14 and 14*a* and eccentric shaft 34 all rotate in unison—to produce a given vibratory excitation. With weights 14 and 14*a* in a same radial disposition as the eccentric portion of eccentric shaft 34, a greatest vibratory amplitude is realized. Patently, then, if weights 14 and 14*a* are radially disposed one hundred and eighty degrees of arc from the eccentric portion of eccentric shaft 34, the vibration is effectively damped; vibrations produced by weights 14 and 14*a* cancel out (and are cancelled out by) vibrations produced by eccentric shaft 34. Accordingly, in order to arrange for a selective adjustment of the amplitude of vibrations produced by mechanism 10, from zero amplitude (in which the weight means are mutually cancelled) to maximum amplitude (in which the weight means are cumulative), the splined drive unit 44 is provided.

Splined drive unit 44 has an axially-extending shaft which, at its outermost end, receives an indexing handwheel 46. The external splines of unit 44 normally engage the end portions of the splines in weight-carrier shaft 16, whereas the internal splines in unit 44 normally engage innermost portions of the external splines of shaft end 36. Now then, by sliding unit 44, outwardly, its external splines will disengage from weight-carrier shaft 16 while its internal splines retain engagement with shaft end 36. Handwheel 46 is provided for this purpose—for axially and slidably shifting the drive unit 44 to disengage same from weight-carrier shaft 16, and for rotatively indexing eccentric shaft 34. Upon the eccentric shaft 34 having been indexed to a desired orientation relative to weights 14 and 14*a*, the drive unit 44 is allowed to re-engage the splining of weight-carrier shaft 16.

Housing 12 has a shouldered sleeve 48 fixed therein which envelops the shaft portion of drive unit 44 and receives one end of a compression spring 50. The opposite end of spring 50 is bottomed in an annular recess formed in drive unit 44. Hence, drive unit 44 is normally slidably urged into common engagement with both shaft end 36 and weight-carrier shaft 16; it requires an outward pull on handwheel 46 to effect the indexing-enabling disengagement of drive unit 44 from shaft 16.

In this embodiment, shaft end 36 has fourteen spline teeth, with fifteen corresponding spline grooves, and the drive unit 44, weight-carrier shaft 16 and shaft 20 are correspondingly so splined. Hence, handwheel 46 can be used to index the eccentric shaft 34, relative to weights 14 and 14*a*, in any one of fifteen radial dispositions, in twenty-four degree increments, from common radial alignment (i.e., 0°/360°) through twenty-four degrees, forty-eight degrees, seventy-two degrees, etc. of radial non-alignment.

As Figures 1 and 3 depict, shafts 16 and 16*a* are of short length, and they are mounted in the tapered roller bearings 18 and 18*a* in immediate adjacency to the axial ends of the weights 14 and 14*a*. The bearing rollers have axes which bisect in planes which exactly bisect the axial centers of the spherical bushings 38. Thus, the loading on the bearings 18 and 18*a* from the eccentric shaft 34—and from the weights 14 and 14*a*—is equalized.

To facilitate indexing of the eccentric shaft 34, sleeve 48 carries an upwardly directed pointer 52, and the rear surface of the handwheel 46 carries a backup ring 54. About the periphery of ring 54 are formed a series of V-shaped notches 56. Each notch 56, upon being aligned with the pointer 52, represents an indexable positioning for the eccentric shaft—positionings in which, selectively, the drive unit 44 may be matingly and slidably engaged with weight-carrier shaft 16.

While I have described my invention in connection with a specific embodiment thereof, it is to be clearly understood that this is done only by way of example, and not as a limitation to the scope of my invention as set forth in the objects thereof and in the appended claims.

I claim:

1. A vibratory mechanism, especially for use with an earth-compacting drum, comprising:
   - a plurality of separate weight means which have eccentric-throw portions;
   - means supporting said weight means for rotation about a rotary axis, in spaced-apart locations with said eccentric-throw portions substantially radially aligned; and
   - means coupling said weight means together for rotation in common; wherein
   - said coupling means comprises resilient means for sustaining and reactively absorbing forces and loads arising from parallel and angular misalignments and rotary and axial displacements of said weight means relative to one another, and rigid shaft means axially interposed between said weight means, with said resilient means interpositioned between, and fixed to, said shaft means and each one of said weight means and further including means engaged with at least one of said weight and coupling means for imparting rotation thereto.

2. A vibratory mechanism, according to claim 1, wherein:

each of said weight means comprises a stub shaft, and an eccentric-throw weighting element coupled to said stub shaft, said weighting element and said stub shaft having means cooperative to effect a rotation of either thereof in coincident response to rotation of the other.

3. A vibratory mechanism, according to claim 2, wherein:

said rigid shaft means has a first attaching member;

said stub shaft has a second attaching member; and said first and second attaching members are each, independently, coupled to said resilient means.

4. A vibratory mechanism, according to claim 3, wherein:

said first attaching member is coupled to said resilient means at a first location, and said second attaching member is coupled to said resilient means at a second location which is between forty-five and one hundred and eighty degrees of arc, relative to said axis, from said first location.

5. A vibratory mechanism, according to claim 2, wherein:

said supporting means comprises a frame and a pair of axially spaced-apart tapered roller bearings interpositioned between each of said weight means and said frame;

said bearings of each pair having rollers with axes which bisect in a plane traversing an axially defined midpoint of that weight means which is supported by said pair of bearings.

6. A vibratory mechanism, according to claim 1, further including:

an eccentric, rotatable shaft having a longitudinal axis;

said shaft having an eccentric portion offset from said longitudinal axis thereof; and wherein said supporting means comprises means mounting said eccentric shaft for rotation about said rotary axis.

7. A vibratory mechanism, according to claim 6, wherein:

said supporting means includes a frame and a pair of tapered roller bearings, spaced apart relative to said rotary axis, interpositioned between each of said weight means and said frame; and said mounting means comprises means journaling said eccentric shaft, at each of the opposite ends thereof, axially equidistant between said bearings of said pairs.

8. A vibratory mechanism, according to claim 7, wherein:

said bearings of each said pair have rollers with axes which bisect in a plane traversing a rotary-axis-defined mid-point of that weight means which is supported by said pair of bearings;

said journaling means comprises a self-aligning bushing; and said plane also traverses a rotary-axis-defined mid-point of said bushing, to impart an equalized loading on said pair of bearings from said eccentric shaft and said weight means.

9. A vibratory mechanism, according to claim 6, wherein:

said rigid shaft means and said eccentric shaft are coaxially disposed.

10. A vibratory mechanism, according to claim 9, wherein:

said rigid shaft means comprises an elongate, tubular element; and said eccentric shaft is substantially enveloped by said tubular element.

11. A vibratory mechanism, according to claim 6, further including:

means joining said eccentric shaft and said plurality of weight means to effect a rotation of either thereof in coincident response to rotation of the other.

12. A vibratory mechanism, according to claim 11, wherein:

said joining means comprises a splined-drive unit having means effecting a mutual, rotary-drive-imparting engagement with both said eccentric shaft and said plurality of weight means.

13. A vibratory mechanism, according to claim 12, wherein:

said weight means of said plurality thereof comprises a weight-carrier shaft;

said eccentric shaft has first axial splines at an end thereof;

said weight-carrier shaft has second axial splines at an end thereof; and said splined-drive unit comprises means mutually engaging both said first and second splines.

14. A vibratory mechanism, according to claim 13, wherein:

said eccentric shaft and said weight-carrier shaft are coaxially aligned;

said first splines are formed on an inner surface of said weight-carrier shaft;

said second splines are formed on an outer surface of said eccentric shaft;

said first and second splines are radially spaced apart, defining an annular space therebetween; and said splined-drive unit is disposed within said space.

15. A vibratory mechanism, according to claim 11, wherein:

said joining means further includes means for selectively and rotatively indexing at least one of said eccentric shaft and said plurality of weight means, to cause said eccentric portion of said shaft and all said eccentric-throw portions of said weight means to be disposed in radial alignment and out of radial alignment with each other.

16. A vibratory mechanism, according to claim 15, wherein:

said indexing means comprises a drive unit interposed between said plurality of weight means and said eccentric shaft; and said drive unit, eccentric shaft, and said plurality of weight means all have means cooperative to effect a common, rotary-drive engagement therebetween, and for slidably supporting said drive unit for axial translation.

17. A vibratory mechanism, according to claim 16, wherein:

said rotary-drive engagement means comprises interengaging, axially-disposed splines in said drive unit, eccentric shaft, and said plurality of weight means.

18. A vibratory mechanism, according to claim 17, wherein:

said drive unit comprises a cylindrical element having said axially-disposed splines formed on inner and outer surfaces thereof;

said plurality of weight means comprises at least one hollow weight-carrier shaft having said axially-disposed splines formed on an inner surface thereof;

said eccentric shaft has said axially-disposed splines formed in an outer surface thereof;

said outer surface splines of said cylindrical element matingly engage said inner surface splines of said hollow weight-carrier shaft; and said inner surface splines of said cylindrical element matingly engage said outer surface splines of said eccentric shaft.

19. A vibratory mechanism, according to claim 18, wherein:

said inner surface splines of said cylindrical element, during axial translation of the latter, matingly engage said outer surface splines of said eccentric shaft through a first, prescribed, axial-travel distance; and said outer surface splines of said cylindrical element, during said translation, matingly engage said inner surface splines of said hollow weight-carrier shaft through a second, prescribed, axial-travel distance which is less than said first prescribed distance, to cause a rotary-drive disengagement to occur between said cylindrical element and said hollow weight-carrier shaft, upon said cylindrical element having moved through an axial-travel distance greater than said second prescribed distance.

20. A vibratory mechanism, according to claim 19, further including:

an indexing handwheel fixed to said cylindrical element, for axially translating said cylindrical element and rotatively indexing said eccentric shaft, upon said cylindrical element having moved said greater distance.

* * * * *